(12) United States Patent
Bennet et al.

(10) Patent No.: US 8,312,708 B2
(45) Date of Patent: *Nov. 20, 2012

(54) CLOSELY COUPLED EXHAUST AFTERTREATMENT SYSTEM FOR A TURBOCHARGED ENGINE

(75) Inventors: David Bennet, Brighton (GB); Brian G. Cooper, Hove (GB); Huntly W. Thomas, Hove (GB); Nick Winder, Brighton (GB)

(73) Assignee: GM Global Technology Operations LLC, Detroit, MI (US)

( * ) Notice: Subject to any disclaimer, the term of this patent is extended or adjusted under 35 U.S.C. 154(b) by 416 days.

This patent is subject to a terminal disclaimer.

(21) Appl. No.: 12/750,231

(22) Filed: Mar. 30, 2010

(65) Prior Publication Data
US 2011/0239646 A1 Oct. 6, 2011

(51) Int. Cl.
*F01N 5/04* (2006.01)
*F01N 3/00* (2006.01)
*F01N 3/02* (2006.01)
*F01N 3/10* (2006.01)

(52) U.S. Cl. ............... 60/280; 60/287; 60/288; 60/297; 60/301; 60/311; 60/605.2

(58) Field of Classification Search .................. 60/280, 60/287, 288, 297, 301, 311, 605.2
See application file for complete search history.

(56) References Cited

U.S. PATENT DOCUMENTS

| | | | |
|---|---|---|---|
| 2001/0032458 A1* | 10/2001 | Suzuki et al. | 60/288 |
| 2009/0151333 A1* | 6/2009 | Vigild et al. | 60/286 |
| 2009/0249785 A1* | 10/2009 | Sausse et al. | 60/602 |

* cited by examiner

*Primary Examiner* — Thomas Denion
*Assistant Examiner* — Dapinder Singh
(74) *Attorney, Agent, or Firm* — Cantor Colburn LLP

(57) ABSTRACT

A closely-coupled exhaust aftertreatment system includes a first exhaust conduit comprising a first valve operable between a first position promoting an exhaust flow within the first exhaust conduit to an inlet of a first oxidation catalyst and a second position promoting the exhaust gas flow within a second exhaust conduit. It also includes a third exhaust conduit fluidly coupled to an outlet of the OC and comprising a second valve operable between a first position promoting an exhaust flow within the third exhaust conduit to an inlet of a particulate filter (PF) and a second position promoting the exhaust gas flow through a fourth exhaust conduit to an inlet in the second exhaust conduit. It further includes a turbocharger fluidly coupled to the second exhaust conduit downstream of the inlet and a selective catalyst reduction (SCR) catalyst that is located downstream of the turbocharger and upstream of the PF.

22 Claims, 8 Drawing Sheets

CLOSELY COUPLED EXHAUST AFTERTREATMENT SYSTEM FOR A TURBOCHARGED ENGINE

FIELD OF THE INVENTION

Exemplary embodiments of the present invention are related to exhaust aftertreatment systems, and, more specifically, to an exhaust aftertreatment system for lean-burn internal combustion engines and vehicles incorporating the same.

BACKGROUND

Internal combustion engines must meet various regulations for reduced emissions and improved fuel economy. One example of a way to improve fuel economy is to operate an engine at an air/fuel ratio that is lean (excess oxygen) of stoichiometry. Examples of lean-burn engines include compression-ignition (diesel) and lean-burn spark-ignition engines. While a lean-burn engine has improved fuel economy, and lower combustion temperatures, which generally result in increased engine-out nitrogen oxides ($NO_X$) emissions, commercial application of lean-burn engines is limited due to a lack of effective methods to remove sufficient $NO_X$ from the lean exhaust stream before it exits the tail pipe to meet regulations.

Reduction of $NO_X$ emissions from an exhaust stream including excess oxygen is a challenge for vehicle manufacturers. It is estimated that compliance with Bin 5 regulations in the United States may require an aftertreatment system capable of 70-90% $NO_X$ conversion efficiency on the FTP (Federal Test Procedure) cycle based on currently anticipated engine-out $NO_X$ levels at a variety of operating temperatures ranging between 200-550° C.

Various aftertreatment systems have been proposed for vehicle applications that employ various exhaust aftertreatment devices. Urea selective catalyst reduction (SCR) catalyst devices employ a $NO_X$ reductant, e.g., urea, that is injected upstream of the catalyst and is converted to ammonia for reduction of $NO_X$ to $N_2$. Use of urea as a reductant necessitates a urea distribution infrastructure and an on-vehicle monitoring system for this secondary fluid, and may require thermal management to address potential problems in cold weather climates due to the relatively high freezing point (−12° C.) of the urea solution. $NO_X$ storage SCR catalysts, e.g., $NO_X$ traps, typically require large catalyst volumes, large amounts of platinum-group metals and low sulfur fuel for efficient storage operation. Such systems require periodic catalyst regeneration involving fuel injection to generate high exhaust gas temperatures and injection of reductants to regenerate the storage material of the catalyst.

While systems that employ SCR catalysts have been used for $NO_X$ reduction in exhaust gas flow streams having excess oxygen, packaging of the various catalysts has been problematic, particularly in relatively smaller vehicles having relatively shorter wheelbases, due the reduced space available to package the desired combinations of catalysts. For example, in some smaller vehicles, it is desirable to package the SCR last where it is farthest from the engine and the exhaust system operating temperatures are lowest, in order to minimize thermal degradation of the SCR catalyst materials and thereby maximize the operating life of the SCR catalyst. While this arrangement is desirable, there is generally not enough room to package the SCR last while also providing the needed mixing length for conversion of the injected urea into ammonia, particularly if the system also employs one or more additional exhaust treatment devices for the reduction of $NO_X$ or oxidation or reduction of other exhaust constituents, including carbon monoxide (CO), various hydrocarbons (HC), particulate matter (PM) and the like. Even where treatment devices are placed away from the engine to lower their operating temperature and improve the device operating life, there are frequently competing considerations, such as device regeneration, that require periodically elevating the device temperature by reheating, which generally employs fuel and reduces the engine and vehicle efficiency and reduces fuel economy. In general, exhaust treatment systems must balance these competing considerations and comply with applicable emission control requirements, particularly the reduction of $NO_X$, while also complying with applicable fuel economy and other engine and/or vehicle requirements.

Accordingly, it is desirable to provide exhaust treatment systems for internal combustion engines, particularly vehicular engines, which provide enhanced flexibility to satisfy competing requirements, including those related to $NO_X$ reduction, fuel economy, thermal management, system/device operating longevity and the like.

SUMMARY OF THE INVENTION

In one exemplary embodiment of the present invention, a closely-coupled exhaust aftertreatment system is provided. The system includes a first exhaust conduit including a first valve operable between a first position and a second position, the first position promoting an exhaust flow within the first exhaust conduit to an inlet of a first oxidation catalyst (OC), and the second position promoting the exhaust gas flow within a second exhaust conduit. The system also includes a third exhaust conduit fluidly coupled to an outlet of the OC, the third exhaust conduit including a second valve operable between a first position and a second position; the first position promoting an exhaust flow within the third exhaust conduit to an inlet of a particulate filter (PF), and the second position promoting the exhaust gas flow through a fourth exhaust conduit to an inlet in the second exhaust conduit. The system further includes a turbocharger that is fluidly coupled to the second exhaust conduit downstream of the inlet and a selective catalyst reduction (SCR) catalyst that is fluidly coupled to the turbocharger to receive the exhaust gas flow therefrom, where the PF is also fluidly coupled to the SCR catalyst to receive the exhaust gas flow therefrom.

The above features and advantages and other features and advantages of the present invention are readily apparent from the following detailed description of the invention when taken in connection with the accompanying drawings.

BRIEF DESCRIPTION OF THE DRAWINGS

Other objects, features, advantages and details appear, by way of example only, in the following detailed description of embodiments, the detailed description referring to the drawings in which.

DESCRIPTION OF THE EMBODIMENTS

Figure 1:
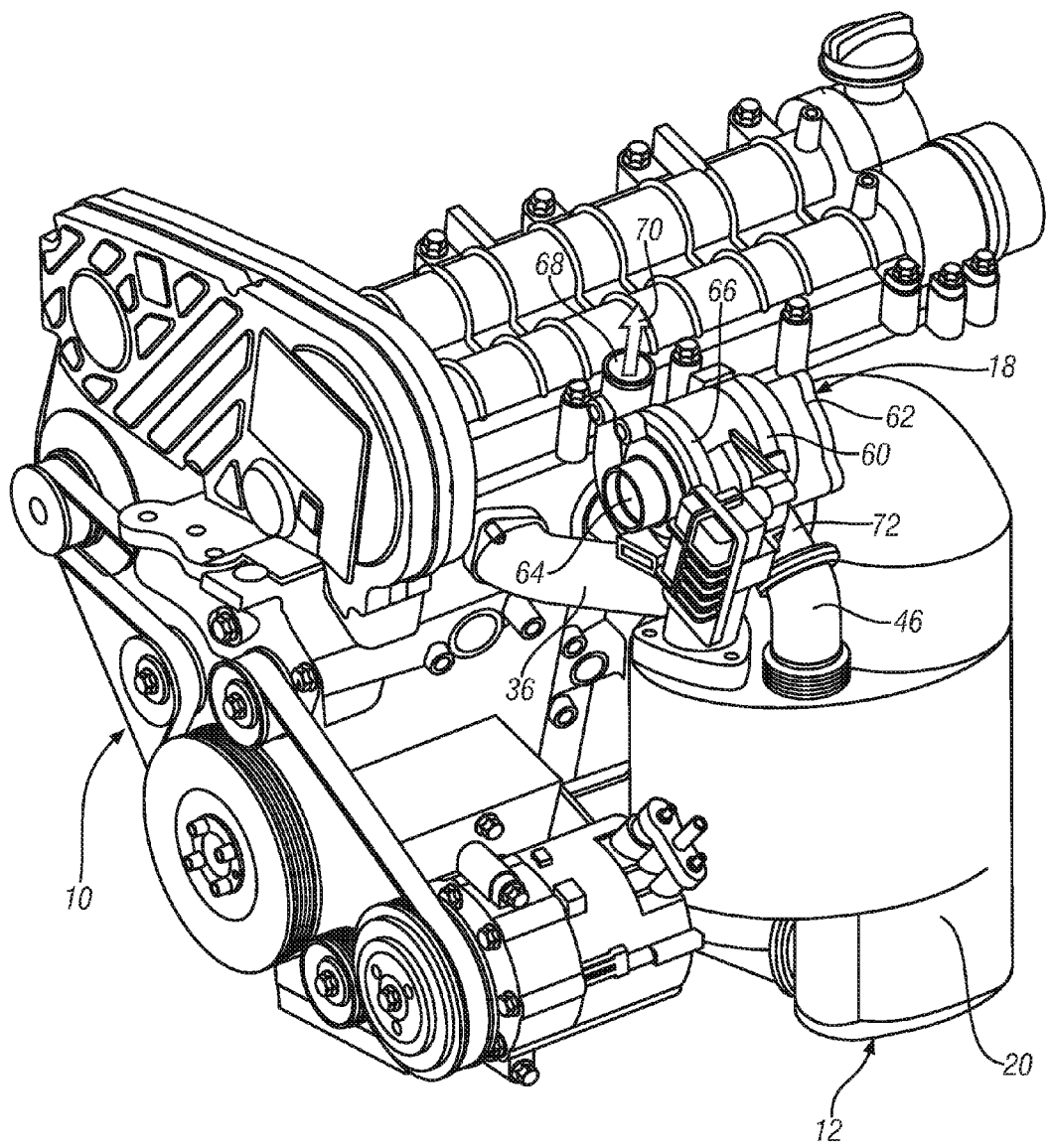
FIG. 1 is a perspective view of an exemplary embodiments of an engine and a closely-coupled exhaust aftertreatment system as disclosed herein.

Referring now to FIGS. 1-5, an exemplary embodiment of an internal combustion engine 10 that is particularly suitable for use in many types of motorized vehicles 1, such as automobiles, light trucks, marine vehicles, ATVs and the like, as well as numerous fixed installation applications, such as generators, pumps and the like. Engine 10 is fluidly coupled to an exhaust aftertreatment system 12, including a plurality of fluidly coupled exhaust aftertreatment devices 14, for treating an exhaust gas flow 16 resulting from its operation. Exhaust aftertreatment system 12 is fluidly coupled to turbocharger 18, and may alternately be fluidly coupled to a plurality of turbochargers (not shown). In an exemplary embodiment, exhaust aftertreatment system 12 is configured to be used as a closely-coupled system in that the exhaust aftertreatment devices 14 are housed in a single housing 20 that may be directly coupled to an exhaust port 24, or to an exhaust manifold 22 that is configured to receive the exhaust gas flows from a plurality of cylinders for exhaust through at least one exhaust port 24, of engine 10 to reduce thermal losses and enhance operating efficiencies of certain of the exhaust aftertreatment devices 14. The exhaust aftertreatment devices 14 are fluidly coupled by a combination of internal conduits and valves that enable flexible reconfiguration and control of the exhaust gas flow 16 to provide a plurality of operating modes. The operating modes may be used to define certain configurations of exhaust aftertreatment system 12 and exhaust aftertreatment devices 14 to provide treatment of predetermined exhaust constituents or to regenerate predetermined exhaust aftertreatment devices 14. The operating modes may also be used to enable balancing of the operating temperatures of all of the exhaust aftertreatment devices 14 so that each device experiences an operating temperature regime that provides a predetermined operating lifetime for that device. The exhaust aftertreatment system 12 can then be designed to obtain a minimum predetermined operating lifetime for each exhaust aftertreatment device 14 that provides a predetermined mean time between failure (MTBF) or other operating lifetime parameter for the exhaust aftertreatment system 12. For example, a start-up mode (FIGS. 2 and 3) may be defined by configuration of the conduits and valves for cold startup of engine 10 when the exhaust gas flow 16 to exhaust aftertreatment system 12 from engine 10 may include unburned HC to promote fast light-off of OC 26 in order to oxidize the HC and prevent or reduce HC slip through the system. In this mode, the system 12 also routes exhaust gas flow 16 through turbocharger 18, SCR catalyst 28 and PF 30 to obtain the benefits of their operation, as well as to warm SCR catalyst 28 and PF 30 and enhance their operating performance. As another example, a normal operating mode (FIGS. 2 and 4) may be defined by configuration of the conduits and valves 38, 50 to shunt exhaust gas flow 16 around OC 26 and through turbocharger 18, SCR catalyst 28 and PF 30 once a predetermined operating temperature or mix of exhaust constituents, or combination thereof is realized. As yet another example, a regeneration mode (FIGS. 2 and 5) may be defined by configuration of the conduits and valves to promote exhaust gas flow 16 through OC 26 directly to PF 30, while shunting flow around turbocharger 18 and a portion of SCR catalyst 28, in order to regenerate PF 30 by oxidation of PM accumulated by its filtering action.

Referring again to FIGS. 1-5, exhaust aftertreatment system 12 may be used with any turbocharged internal combustion engine 10 and engine control system 32. An exemplary engine 10 and control system 32 includes a conventional four-cycle diesel, gasoline or natural gas fueled internal combustion engine and electronic engine control module (ECM) 34. The engine 10 may include a compression-ignition or diesel engine having an operating regime such that it is primarily a lean-burn engine and is operated on an air/fuel mixture where the amount of fuel is lower or leaner than the stoichiometric amount required for combustion, or from another perspective, where the oxygen exceeds the stoichiometric amount. Alternately, engine 10 may include an engine employing any one of a number of engine control strategies that operate lean of stoichiometry, e.g., homogeneous-charge compression-ignition engines and lean-burn spark-ignition engines. Engine 10 includes one or more reciprocating pistons (not shown) attached to a crankshaft (not shown), which is operably attached to a driveline (not shown) or powertrain (not shown) of vehicle 1 to deliver tractive torque to the driveline. During operation, internal combustion processes in engine 10 generate an exhaust gas feedstream or flow 16 that travels in the directions illustrated and contains regulated constituents as combustion by-products, and that must be transformed by the exhaust aftertreatment system 12 prior to release from the system, such as to an external environment. The constituents of exhaust gas flow 16 produced by engine 10 under lean combustion conditions include HC, CO, $NO_X$ and PM, among others.

Figure 3:
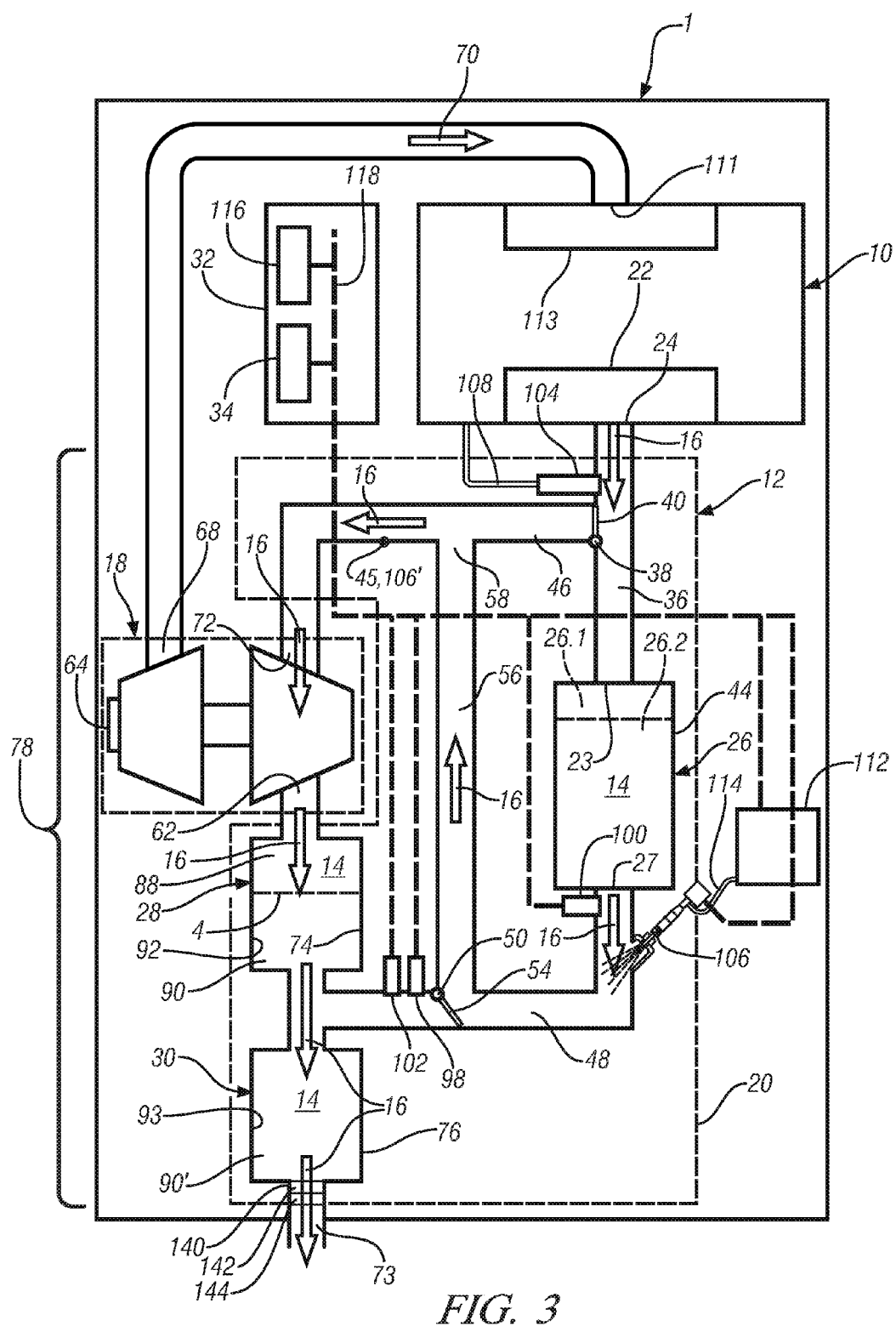
FIGS. 3, 4 and 5 are schematic illustrations of the exhaust aftertreatment system of FIG. 1 in various exemplary operating modes as disclosed herein.
Figure 4:
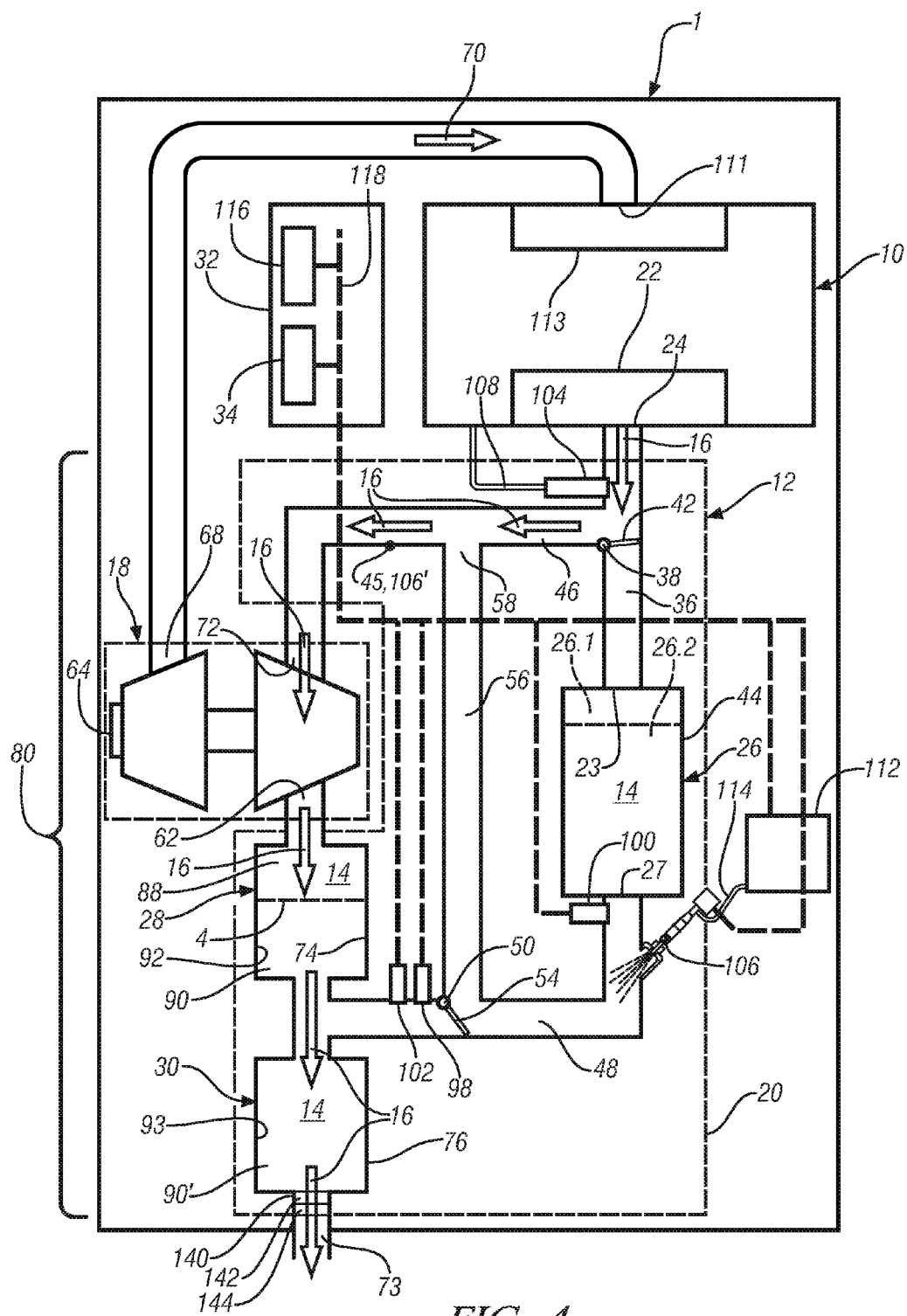
Figure 5:
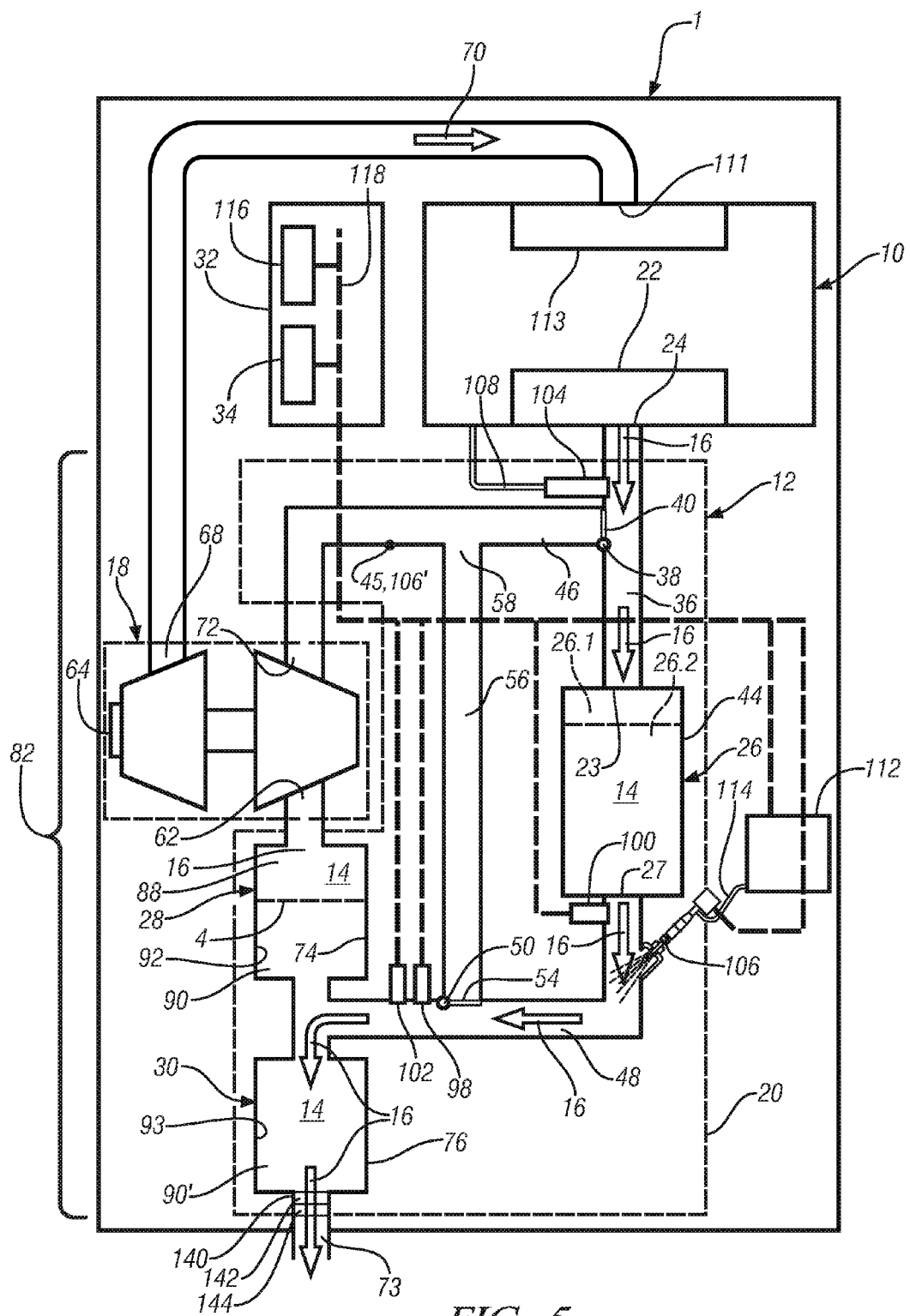

Exhaust aftertreatment system 12 is an integrated system intended to treat the regulated constituents of the exhaust gas flow 16 to produce a flow that includes unregulated constituents, or regulated constituents in amounts that may be released from the system to the external environment, such as by reducing amounts of the regulated constituents to acceptable levels or by chemically converting them to unregulated materials that may be released. An exhaust manifold 22, or manifolds, and associated conduits entrain and direct the exhaust gas flow 16 to and through the exhaust port 24 into exhaust aftertreatment system 12. An internal exhaust manifold 22, i.e, located within the head or engine, as illustrated in FIGS. 3-5, is particularly useful in order to promote close coupling of exhaust aftertreatment system 12, but both internal and external exhaust manifolds may be used in conjunction with exhaust aftertreatment system 12.

Exhaust aftertreatment system 12 includes a plurality of fluidly coupled exhaust aftertreatment devices 14 that are housed within housing 20 and coupled by a combination of a plurality of conduits and valves that may be switched from one position (e.g, opened) to another position (e.g., closed) to define a plurality of flow paths through the system and provide a plurality of different combinations of exhaust aftertreatment devices. While the valves may be moved from fully opened to fully closed positions, movement to partially opened or partially closed positions is also possible. Housing 20 may include any suitable housing shape or size, and may be formed from any suitable high temperature material suitable for use over the operating temperature range of the system, including, in an exemplary embodiment, an operating temperature range of about 200-550° C. Suitable materials for housing 20 include various metals, such as various grades of stainless steels, as well as various ceramic materials. The plurality of combinations of exhaust aftertreatment devices 14 define a corresponding plurality of operating modes or configurations in which exhaust aftertreatment system 12 may be operated.

Exhaust aftertreatment system 12 also includes a first exhaust conduit 36 that is fluidly coupled to exhaust port 24. Fluid coupling as used herein refers to a sealed coupling that is sufficient to enable containment of exhaust gas flow 16 within exhaust aftertreatment system 12 and exhaust aftertreatment devices 14 at predetermined operating pressures and flow rates. Fluid coupling may be accomplished by conventional fluid coupling devices, including boltable or clampable flanges and gaskets, seals or packings, welds and the like. First exhaust conduit 36 includes a first valve 38 that is operable, i.e., moveable in conjunction with a predetermined operating control scheme or architecture, between a first position 40 (FIGS. 3 and 5) and a second position 42 (FIG. 4). Moving first valve 38 to first position 40 promotes exhaust gas flow 16 within the first exhaust conduit 36 to an inlet of OC 26. OC 26 may be housed within a chamber formed within housing 20, or may be housed within a separate can 44, such as a metal can, that is disposed within housing 20. Moving first valve 38 to second position 42 promotes exhaust gas flow 16 within second exhaust conduit 46 that extends between first valve 38 and an inlet of turbocharger 18.

Exhaust aftertreatment system 12 also includes a third exhaust conduit 48 that is fluidly coupled to an outlet of OC 26. Third exhaust conduit 48 extends from the outlet of OC 26 to an inlet of PF 30. Third exhaust conduit 48 includes a second valve 50 operable between a first position 52 (FIG. 5) and a second position 54 (FIGS. 3 and 4). Moving second valve 50 to first position 52 promotes exhaust gas flow 16 within third exhaust conduit 48 to an inlet of PF 30. Moving second valve 50 to second position 54 promotes exhaust gas flow 16 through a fourth exhaust conduit 56 (FIG. 3) to an inlet 58 in second exhaust conduit 46.

Exhaust aftertreatment system 12 is configured for use with turbocharger 18. Turbocharger 18 includes a turbine volute conduit 60 that spirals inwardly about a turbine wheel, which is in fluid communication with the conduit through the turbine nozzle. The nozzle directs exhaust gas flow 16 across the turbine blades on the turbine wheel where it is exhausted through the turbine outlet 62, thereby causing rotation of the turbine wheel and turbine shaft to which it is attached; which in turn rotates the compressor wheel that is attached to the opposite end of the shaft. Rotation of the compressor wheel draws air into the compressor intake 64 which is then compressed as it passes through the compressor nozzle and is expelled through compressor volute conduit 66 and compressor outlet 68 as forced-induction airflow 70. Turbocharger 18 is disposed on housing 20 and turbine inlet 72, which opens into turbine volute conduit 60 and is fluidly coupled to the second exhaust conduit 46 downstream of the inlet 58. Turbocharger 18 acts as an exhaust heat recovery device that is configured to produce forced-induction intake airflow 70 to enhance the operating efficiency of engine 10.

Exhaust aftertreatment system 12 also includes SCR catalyst 28 that is fluidly coupled to turbine outlet 62 to receive the exhaust gas flow 16 therefrom. PF catalyst 30 is fluidly coupled to SCR catalyst 28 to receive the exhaust gas flow 16 therefrom. PF 30 is fluidly coupled to a conduit 73 for expulsion of the treated exhaust gas flow 16 to the external environment. Each of SCR catalyst 28 and PF 30 may be housed within a respective chamber formed within housing 20, or may be housed within separate cans 74, 76, respectively, such as metal cans, that are disposed within housing 20, or both. PF 30 may also include an SCR catalyst 90' disposed on the filter including a urea SCR (U-SCR) catalyst and the combination of PF 30 and, the U-SCR catalyst may be housed in a single can such as can 76.

Figure 2:
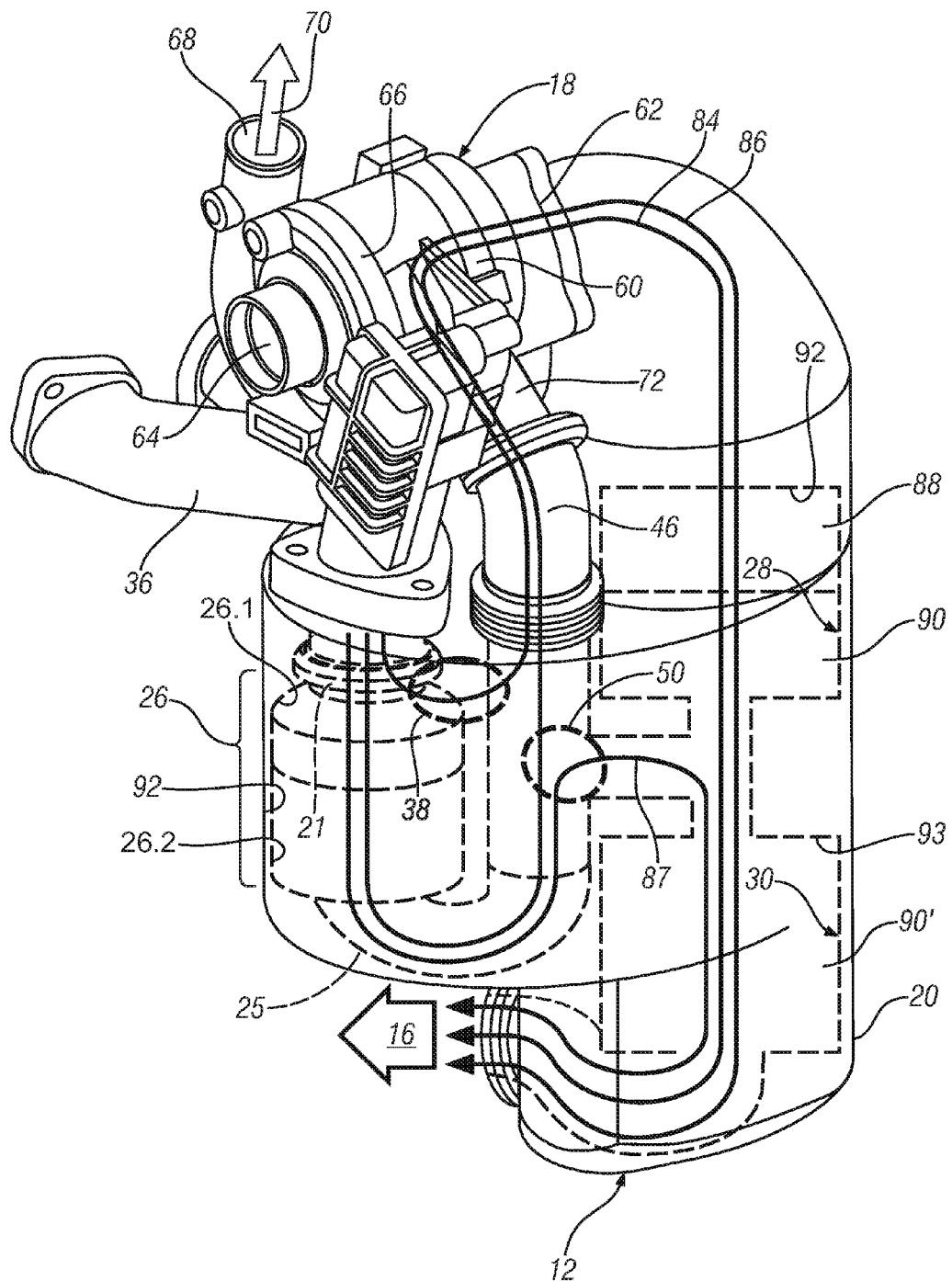
FIG. 2 is an enlarged perspective view of the exhaust aftertreatment system of FIG. 1.

First exhaust conduit 36, second exhaust conduit 46, third exhaust conduit 48 and fourth exhaust conduit 56 may be formed as integral conduits within housing 20, or may include individual pipes or conduits that are fluidly coupled to their respective exhaust aftertreatment devices 14 or to one another, as described herein, and disposed on or within housing 20. By disposed on, it is intended that all or a portion of one or more of the conduits may be disposed on the outside of housing 20, or may extend through the outer wall of housing 20, as illustrated in FIGS. 1 and 2.

First valve 38 and second valve 50 may each include an electrically controllable valve or a thermostatically controllable valve, or may include a combination of electrically and thermostatically controllable valves. First valve 38 and second valve 50 may include any suitable high temperature valve having an operating temperature range commensurate with that of exhaust aftertreatment system 12, and may include any suitable valve mechanism, including gate, poppet, plug, globe, check, butterfly, diaphragm, ball, needle or pinch valves, or a combination thereof. First valve 38 or second valve 50 may be actuated mechanically using a thermostat or other mechanical actuator, or electrically using an electric motor or solenoid, or using a combination thereof.

As noted above and illustrated in FIGS. 3-5, the positions of first valve 38 and second valve 50 may be movably configured and controlled to define a plurality of operating modes, including a first operating mode 78 (FIG. 3), a second operating mode 80 (FIG. 4) and a third operating mode 82 (FIG. 5). For example, in the embodiments of operating modes illustrated in FIGS. 3-5, first valve 38 is movable between first position 40 that fully opens first exhaust conduit 36 and substantially closes second exhaust conduit 46 and second position 42 that substantially closes first exhaust conduit 36 and fully opens second exhaust conduit 46. Similarly, second valve 50 is movable between first position 52 that fully opens third exhaust conduit 48 and substantially closes fourth exhaust conduit 56 and a second position 54 that substantially closes third exhaust conduit 48 and fully opens fourth exhaust conduit 56. In other exemplary embodiments, other positions of first valve 38 and second valve 50 are possible, including those that define first and second positions of these valves that are partially open and partially closed, or that utilize more than two positions of these valves to define a corresponding plurality of operating modes, or that utilize continuously variable positions of these valves to define a corresponding plurality of operating modes.

In the first operating mode 78, first valve 38 is in the first position 40 and the second valve 50 is in the second position 54 and the exhaust gas flow 16 follows a first path 84 (FIG. 2) through the OC 26, turbocharger 18, SCR catalyst 28 and PF 30. The first operating mode 78 is particularly suitable as a start-up or cold-start mode, as described herein, wherein the engine 10 and exhaust aftertreatment system 12 have not yet achieved a predetermined operating temperature or a predetermined mixture of exhaust constituents, such as, for example, where the temperature of engine 10 and exhaust aftertreatment system 12 are lower (colder) than a predetermined operating temperature, or where a predetermined lean-burn mixture of constituents has not yet been achieved (e.g., where the mixture of exhaust constituents is fuel or HC-rich). In the first operating mode, first turbocharger 18 is configured to supply forced-induction intake airflow 70 to an intake port 111 of engine, or alternately to intake manifold 113 for distribution to the engine cylinders (not shown).

In the second operating mode 80 (FIG. 4), first valve 38 is in the second position 42 and the second valve is in the second position 54 and the exhaust gas flow 16 follows a second path 86 (FIG. 2) through turbocharger 18, SCR catalyst 28 and PF 30. The second operating mode 80 is particularly useful as a normal operating mode, as described herein, wherein the engine 10 and exhaust aftertreatment system 12 have achieved a predetermined operating temperature or a predetermined mixture of exhaust constituents, such as, for example, where the engine 10 and exhaust aftertreatment system 12 are at or above a predetermined operating temperature where SCR catalyst 28 and PF 30 are functioning, or within a range of temperatures associated with a desirable operating temperature, or where a predetermined lean-burn mixture of exhaust constituents has been achieved (e.g., where the exhaust gas has a temperature or mixture representative of a regeneration condition, or where $NO_X$ concentration is above a predetermined amount or within a predetermined range of amounts and use of SCR catalyst 28 or PF 30, or both, are needed to control exhaust emissions, but OC 26 is not. In the second operating mode, first turbocharger 18 is also configured to supply forced-induction intake airflow 70 to an intake port 111 of engine, or alternately to intake manifold 113 for distribution to the engine cylinders (not shown).

In the third operating mode 82 (FIG. 5), first valve 38 is in the first position 40 and the second valve is in the first position 52 and exhaust gas flow 16 follows a third path 87 (FIG. 2) through OC 26 and PF 30. The third operating mode 82 is particularly useful as a regeneration mode, as described herein, wherein the engine 10 and exhaust aftertreatment system 12 have exceeded a predetermined operating temperature limit or a predetermined mixture of exhaust constituents, or where a regeneration temperature or regeneration mixture of exhaust constituents, or regeneration condition has been achieved, such as, for example, where the engine 10 and exhaust aftertreatment system 12 are above a predetermined operating temperature limit for SCR catalyst 28 and PF 30, or where a predetermined mixture of exhaust constituents, predetermined time interval or predetermined operating parameter or condition (e.g., backpressure upstream of PF 30) has been achieved. In the third operating mode 82, exhaust gas flow 16 is routed so that it does not pass through turbocharger 18 or SCR catalyst 28 until the desired regeneration has been accomplished. During this mode, the exhaust gas flow 16 through turbocharger 18 may not be sufficient to achieve a predetermined forced-induction intake airflow 70 or boost desired to engine 10. In such cases, as well as during transient conditions that occur to turbocharger exhaust input and forced induction intake airflow 70 while changing from one mode to another mode, when the positions of first valve 38 and second valve 50 are being changed and the exhaust gas flow 16 through turbocharger 18 also may not be sufficient to achieve a predetermined forced-induction intake airflow 70 or boost desired to engine 10. In such cases, the operating mode may be changed to one of first mode 78 or second mode 80 to provide the predetermined forced-induction intake airflow 70. Alternately, it may be desirable to provide means to supplement the forced-induction intake airflow 70 with an additional amount of forced-induction intake airflow, as described herein, so that the system may remain in the third operating mode 82 while also providing the desired amount of forced-induction intake airflow.

In an exemplary embodiment, the exhaust aftertreatment devices 14 include OC 26, SCR catalyst 28 and PF 30, and more particularly, where engine 10 is a diesel engine, may include a diesel OC 26 (DOC), SCR catalyst 28 and diesel PF 30 (DPF). The SCR catalyst 28 may include any suitable SCR catalyst 28 or combination of SCR catalysts 28. In an exemplary embodiment, SCR catalyst 28 may include a lean $NO_X$ trap (LNT) 88 or a U-SCR catalyst 90. Alternately, SCR catalyst 28 may include a combination of a LNT 88 and a U-SCR catalyst 90 (FIG. 2). Even more particularly, SCR catalyst 28 may include a configuration where LNT 88 is located downstream of and fluidly coupled to turbine outlet 62 and U-SCR catalyst 90 is located downstream of and fluidly coupled to LNT 88 (FIG. 2). Alternately, a U-SCR catalyst 90' may be housed with PF 30 (FIG. 2). In this configuration, U-SCR catalyst 90' and PF 30 may be housed on separate substrates, or more particularly, U-SCR catalyst 90' may be disposed on PF 30 and comprise a two-way catalyst, as described herein.

In the exemplary embodiment of FIGS. 1-5, OC 26 is in fluid communication with the engine 10 and, with reference to the exhaust gas flow 16, is located upstream from SCR catalyst 28, including LNT catalyst 88 and U-SCR catalyst 90, and is configured to oxidize certain constituents of the exhaust gas flow 16 to produce unregulated by-products or constituents that are adapted for further treatment in other components of exhaust treatment system 12, as described herein. In the first operating mode 78 (FIG. 3) of exhaust aftertreatment system 12, OC 26 is fluidly coupled to LNT catalyst 88, U-SCR catalyst 90 and two way catalyst, including PF 30 and U-SCR catalysts 90', respectively. In the second operating mode 80 (FIG. 4), exhaust gas flow 16 is shunted around OC 26 through LNT catalyst 88, U-SCR catalyst 90 and two way catalyst, including PF 30 and U-SCR catalysts 90'. If the use of U-SCR catalysts 90, 90' is desired in this operating mode, valve 38 may be left partially open to promote a portion of exhaust gas flow 16 within first, third, fourth and second exhaust conduits to transport urea from the urea injector 106 to U-SCR catalysts 90, 90'. Alternately, valve 38 may be placed in second position 42 and a second urea injector 106' that may also be fluidly coupled to urea tank 112 may be placed in second exhaust conduit 46, such as at location 45, in order to provide urea to U-SCR catalysts 90, 90'. In the third operating mode 82 (FIG. 5), OC 26 is fluidly coupled only to PF 30 and U-SCR catalyst 90' to avoid damage or reduction of the service life of LNT catalyst 88. In an exemplary embodiment, OC 26 is a flow-through device that consists of a metal or ceramic monolith or substrate having a honeycomb-like structure that includes a plurality of generally parallel, longitudinally-extending, interconnected cells that provide a network comprising a plurality of flow channels for receiving exhaust gas flow 16 and are separated by a corresponding network of cell walls. The substrate has a large surface area along the cell walls. The cell walls have a washcoat that includes a porous ceramic matrix with a surface that is coated with a catalytically active amount of a platinum group metal catalyst. Suitable platinum group metals include Pt, Pd, Rh, Ru, Os or Ir, or a combination thereof. Of these, Pt or Pd, or combinations thereof, including alloys thereof, are particularly useful. As the exhaust gas flow 16 traverses the length of the OC 26, particularly the flow channels and the washcoated cell walls, the platinum group metal catalyst catalyzes the oxidation of CO to $CO_2$, as well as catalyzing the oxidation of various HC constituents, including gaseous hydrocarbons and liquid hydrocarbon particles, such as unburned fuel or oil, or fuel or other HC purposefully introduced into exhaust aftertreatment system to form $CO_2$ and $H_2O$, thereby reducing harmful emissions. For example, in the first operating mode 78 the control system 32, including ECM 34, may be used to cause combustion resulting in a higher level of HC in the exhaust gas flow 16 than is generated with stoichiometric air/fuel mixtures during normal combustion. The OC 26 is configured to light-off and catalyze the decomposition by oxidation of at least a portion of the increased amounts of HC in order to reduce, or alternately to prevent, the HC in the exhaust gas flow from reaching the U-SCR catalysts 90, 90' and poisoning these devices by reducing their ability to catalyze $NO_X$, or from reaching the external environment by release from the exhaust aftertreatment system 12. The exothermic oxidation reaction also warms the other exhaust treatment devices 14, including SCR catalyst 28, to a predetermined operating temperature as described herein. In another example, in the third operating mode 82 the control system 32, including ECM 34, may be used to cause combustion resulting in a higher level of HC in the exhaust gas flow 16 than is generated with stoichiometric air/fuel mixtures during normal combustion and the heat from the exothermic oxidation reaction may be used to regenerate PF 30 by oxidation of the PM entrained therein.

OC 26 may be configured to convert various regulated exhaust constituents to other regulated or unregulated exhaust constituents through oxidation. For example, OC 26 may be configured to oxidize hydrocarbons (HC) to carbon dioxide $CO_2$ and water ($H_2O$), convert carbon monoxide (CO) to carbon dioxide ($CO_2$) convert sulfur dioxide ($SO_2$) to sulfur trioxide ($SO_3$) and/or sulfuric acid ($H_2SO_4$) and convert nitrogen oxide (NO) to nitrogen dioxide ($NO_2$), or otherwise. It will be understood that OC 26 may be configured to perform any one of the above conversions, combinations of the above conversions, or even all of the above conversions, depending on the reactant compounds and their concentrations found in the exhaust gas flow 16, the temperature of OC 26, and the platinum group metals selected as the catalyst. Other oxidations are contemplated as well, such as oxidation of aldehydes, polycyclic aromatic hydrocarbons or otherwise. Further, the reactions in OC 26 may be used to reduce the odor of certain emission components.

OC 26 is disposed within housing 20. It may be disposed in a chamber 92 formed within housing 20 (FIG. 2), or alternately, may be disposed in a can 44 that is in turn disposed within housing 20, such as a metal can having an inlet opening and outlet opening, or otherwise, configured for providing support and directing exhaust gas flow 16 to and from OC 26, or may be disposed in both chamber 92 and can 44. The chamber 92 or can 44 may comprise any suitable shape or size including those having a cylindrical shape. The compartment further may include attachment features, such as a cylindrical inlet pipe 21 (FIG. 2) located proximate an inlet opening 23 (FIGS. 2 and 3-5) and a cylindrical outlet pipe 25 (FIG. 2) located proximate an outlet opening 27 of the compartment for fluid coupling of OC 26 to an exhaust pipe and/or another component of the exhaust aftertreatment system 12. It should be appreciated that OC 26, including the housing 20, may include one or more additional exhaust components (FIG. 3) for facilitating operation of OC 26, or exhaust aftertreatment system 12, or control system 32, including, but not limited to, various gas sensors 98 (e.g., $NO_X$), temperature sensors 100, pressure sensors 102, HC injectors 104 or urea injectors 106, or otherwise. Such additional features may be particularly advantageous for monitoring characteristics of the exhaust gas flow 16, such as flow rate of certain emission components (e.g., PM or otherwise), which may be particularly advantageous for determining the necessity of initiating the operation of OC 26, SCR catalyst 28, including LNT catalyst 88 or U-SCR catalysts 90, 90' or regeneration of PF 30.

In one particular configuration, OC 26 is configured to oxidize nitrogen oxide within exhaust gas flow 16 to nitrogen dioxide. This is advantageous as this conversion assists with the overall $NO_X$ conversion process by enabling storage of nitrogen dioxide in LNT catalyst 88 or reduction to nitrogen by U-SCR catalysts 90, 90' or a combination thereof, when the proper conditions for these reactions exist within exhaust aftertreatment system 12. Oxidation of nitrogen and the other constituents described herein is promoted under lean burn conditions which have relatively higher $O_2$ levels and lower HC levels, which conditions can be affected using control system 32, including the ECM 34. Accordingly, placement of OC 26 upstream from the LNT catalyst 88 and U-SCR catalysts 90, 90' is particularly advantageous, particularly given the ability to reconfigure exhaust aftertreatment system 12 to alter the arrangement of these devices in accordance with the modes described herein. It is also very advantageous to closely couple the exhaust aftertreatment system 12, and OC 26 in particular, proximate the engine 10 and exhaust port 24, preferably as close to the engine as possible, in order to maintain an operating temperature within OC 26 of at least about 356° F. (180° C.), and more preferably in the range of about 482° F. (250° C.) to about 842° F. (450° C.).

In the exemplary embodiment of exhaust aftertreatment system 12 and turbocharger 18, as shown in FIGS. 1-5, OC 26 comprises a first OC 26.1 and a second OC 26.2 fluidly coupled to and located downstream from the first OC 26.1. This arrangement can be used to enhance the overall treatment capacity of OC 26 by providing a larger catalytically active surface. It can also be used to alter the light-off characteristics of OC 26 by providing a smaller OC 26.1 upstream of a larger OC 26.2, wherein the smaller thermal mass of OC 26.1 promotes more rapid heating and light-off of this device, and wherein the exothermic reaction resulting from the light-off of OC 26.1 is used to rapidly heat OC 26.2 and promote a more rapid light-off than would occur absent the action of OC 26.1. This arrangement is particularly advantageous for cold start conditions as it enables rapid light-off of both OC 26.1 and OC 26.2 and reduces HC slip through exhaust aftertreatment system 12. In an exemplary embodiment of this arrangement, the first OC 26.1 has a first volume ($V_1$) and the second OC 26.2 has a second volume ($V_2$), and $V_1 < V_2$.

As illustrated in the embodiments of FIGS. 1-5, SCR catalyst 28 includes an LNT catalyst 88 fluidly coupled to turbocharger 18 and U-SCR catalyst 90. LNT catalyst 88 is located downstream (relatively farther from the engine and further along the exhaust gas flow path) from engine 10 than OC 26, between the OC 26 and U-SCR catalyst 90. LNT 88 is configured to store certain constituents of the exhaust gas flow 16, particularly $NO_X$, for release and conversion to produce unregulated by-products or regulated constituents that are adapted for further treatment in other components of exhaust aftertreatment system 12, as described herein. LNT catalyst 88 may include a ceramic flow-through monolith with a catalyst washcoat disposed on the walls of the monolith.

LNT catalyst 88 is a flow-through device that may include a ceramic monolith or substrate having a honeycomb-like structure that includes a plurality of generally parallel, longitudinally-extending, interconnected cells that provide a network comprising a plurality of flow channels for receiving exhaust gas flow 16 and are separated by a corresponding network of cell walls. The substrate has a large surface area along the cell walls. The washcoat is disposed on the cell walls of the ceramic flow-through monolith. The washcoat includes an oxidation catalyst, an adsorbent and a reduction catalyst disposed on the porous matrix. The washcoat may be disposed anywhere along the cell walls of the plurality of cell passages. The washcoat includes a porous matrix with a surface that is coated with a catalytically active amount of an oxidation catalyst, an adsorbent and a reduction catalyst. In an exemplary embodiment, the oxidation catalyst may include Pt or Pd; the adsorbent may include an oxide or other compound of Ba, Ca, Sr, Mg, K, Na, Li, Cs, La or Y or a combination thereof; and the reduction catalyst may include Rh. The porous matrix may include a porous ceramic matrix, including various porous zeolite matrices. The ceramic wall-flow monolith may be made from any suitable ceramic, including cordierite or alumina or the like.

The adsorbent is the $NO_X$ storage material of LNT catalyst 88. The adsorbent is disposed on the washcoat and may also extend into the cell walls. Under conditions leaner than a stoichiometric air to fuel ratio, i.e., having excess air, referred to as a lean condition, $NO_X$ is oxidized on the oxidation catalyst and stored by adsorption on the adsorbent, primarily in the form of a nitrate. When control system 32 provides conditions in exhaust aftertreatment system 12 richer than a stoichiometric air to fuel ratio, i.e., having excess fuel, referred to as a rich condition, either by controlling combustion in engine 10 or by direct dosing or injection of HC reductant into the exhaust aftertreatment system 12 using an HC fuel injector 104, $NO_X$ is discharged from the $NO_X$ storage material. NO is reduced to nitrogen with HC and CO in the exhaust gas, while PM in PF 30 is further oxidized with the active oxygen thus generated. LNT catalyst 88 is adapted to provide adsorption of $NO_X$ over the entire operating temperature range of exhaust aftertreatment system 12 and engine 10, including typical ambient vehicle storage/starting temperatures of from about −40° F. (about −40° C.) to about 120° F. (about 49° C.) to operating temperatures up to about 1292° F. (about 700° C.). Generally, catalytic decomposition of $NO_X$ in the LNT catalyst 88 begins to occur at an operating temperature of 356° F. (180° C.), with a more preferred operating temperature for $NO_X$ decomposition in LNT catalyst 88 being at least about 392° F. (200° C.), and even more preferably an operating temperature range of about 482° F. (250° C.) to about 842° F. (450° C.). Likewise, PF 30 of the two-way catalyst filters soot over the entire operating temperature range of engine 10, including typical ambient vehicle storage/starting temperatures from about −40° F. (about −40° C.) to about 120° F. (about 49° C.) to operating temperatures up to about 1292° F. (about 700° C.). Passive regeneration of PF 30 and oxidation of the soot particles occurs in the presence of $NO_X$ over the temperature range of 482° F. (250° C.) to about 842° F. (450° C.), whereas active regeneration and oxidation of the soot particles occurs in the presence of $O_2$ at temperatures of about 932° F. (500° C.) or more, and more preferably over the temperature range of about 1112° F. (600° C.) to about 1202° F. (650° C.).

$NO_X$ adsorber systems of LNT catalyst 88 incorporate a $NO_X$ sorbent or adsorber. The storage components in $NO_X$ adsorbers include alkaline earth elements and alkali metals, including Ba, Ca, Sr, Mg, K, Na, Li, Cs, La or Y, or combinations thereof generally as oxides or other compounds of these elements. The overall cycle of $NO_X$ adsorber operation may be described by the following five steps: nitrogen monoxide oxidation to nitrogen dioxide, nitrogen oxides ($NO_2$ or NO) adsorption, the third and fourth steps are $NO_X$ release from the nitrite or nitrate sites and the fifth step is $NO_X$ reduction to nitrogen. During operation, under rich conditions, the LNT catalyst 88 also advantageously produces ammonia that may be used in U-SCR catalysts 90, 90'.

As the exhaust gas flow 16 traverses the length of the LNT catalyst 88, particularly the flow channels and the washcoated cell walls, the platinum group metal catalyst or base metal catalyst, or a combination thereof, catalyzes various reactions as described herein. In one particular configuration, LNT catalyst 88 is configured to oxidize nitrogen oxide within exhaust gas flow 16, as well as other oxidation reactions similar to those of OC 26. This is also advantageous as this conversion assists with the overall $NO_X$ conversion process by enabling subsequent reduction to nitrogen by U-SCR catalysts 90, 90' when the proper conditions for this reaction exist within exhaust aftertreatment system 12. This occurs under lean burn conditions which have relatively higher $O_2$ levels and lower HC levels, which conditions can be affected using control system 32, including ECM 34. In this same configuration, LNT catalyst 88 may also be used to reduce $NO_X$ within exhaust gas flow 16 to nitrogen when the proper conditions for this reduction reaction exists within an exhaust aftertreatment system 12, such as under conditions with relatively higher engine out HC levels where the $O_2$ that would otherwise promote the oxidization described has been consumed. This reduction reaction may also occur where relatively higher HC levels are obtained by the direct injection of HC upstream of LNT catalyst 88 using HC injector 104, which conditions can be affected using control system 32, including the ECM 34.

LNT 88 is disposed within housing 20. It may be disposed in a chamber 92 formed within housing 20 (FIG. 2). It may also be disposed in a can 74 that is in turn disposed within housing 20, such as a metal can having an inlet opening and outlet opening, or otherwise, configured for providing support and directing exhaust gas flow 16 to LNT catalyst 88. It may also be disposed in both chamber 92 and can 74. The chamber 92 or can 74 may comprise any suitable shape or size including those having a cylindrical shape. The compartment further may include attachment features, such as a cylindrical inlet pipe located proximate an inlet opening and a cylindrical outlet pipe located proximate an outlet opening of the compartment for fluid coupling of LNT catalyst 88 to an exhaust pipe and/or another component of the exhaust aftertreatment system 12. It should be appreciated that LNT catalyst 88, including the housing 20, may include one or more additional exhaust components for facilitating operation of LNT catalyst 88, or exhaust aftertreatment system 12, or control system 32, including, but not limited to, various gas sensors 98 (e.g., $NO_X$) or temperature sensors 100, pressure sensors 102, HC injectors 104 or urea injectors 106, or otherwise. Such additional features may be particularly advantageous for monitoring characteristics of the exhaust gas flow 16, such as the flow rate of certain emission components (e.g., particulate matter or otherwise), which may be particularly advantageous for determining the necessity of initiating OC 26, LNT catalyst 88 or U-SCR catalysts 90, 90' or regeneration of PF 30.

In the embodiments of FIGS. 1-5, two-way catalyst includes PF 30 and U-SCR catalyst 90'. The two-way catalyst is a wall-flow-device that includes a ceramic monolith or substrate having a honeycomb-like structure that includes a plurality of generally parallel, longitudinally-extending, interconnected cells that provide a network comprising a plurality of flow channels for exhaust gas flow 16 and are separated by a corresponding network of porous cell walls. The substrate has a large surface area along the cell walls. Alternating adjacent cells have one of the inlet or outlet plugged such that an alternating array of inlets is plugged with inlets of the immediately adjacent cells being open, and an alternating array of outlets is plugged with outlets of the immediately adjacent cells being open. The structure has open pores in the cell walls. Thus, the exhaust gas flow 16 passes into the plurality of inlets and is forced through the porous cell walls and into the adjacent outlet cells where it then flows out the plurality of unplugged outlets. The pores permit the gaseous constituents to pass through the cell walls while the PM is entrapped within the pores, thereby providing the PM filtering action of PF 30. U-SCR catalyst 90' is provided as a washcoat disposed on the ceramic wall-flow monolith. The washcoat includes an SCR catalyst disposed on a ceramic matrix. The washcoat may be disposed along the cell walls of the plurality of inlet passages or the plurality of outlet passages, or both. In one exemplary embodiment, the washcoat is disposed on the plurality of outlet passages. The washcoat includes a porous matrix with a surface that is coated with a catalytically active amount of a reduction catalyst. The ceramic wall-flow monolith may be made from any suitable ceramic, including cordierite or alumina or the like. Use of two-way catalyst is advantageous because of the space reduction achieved versus the use of a discrete PF 30 and U-SCR catalyst 90', as well as the reduction in the overall number of individual exhaust components. The two-way catalyst, including PF 30 and U-SCR catalyst 90', is adapted to provide reduction of $NO_X$ (U-SCR catalyst 90') and collection of II (PF 30) over the entire operating temperature range of exhaust aftertreatment system 12 and engine 10, including typical ambient vehicle storage/starting temperatures and operating temperatures as described herein. Passive regeneration and active regeneration and oxidation of the soot particles occurs in the presence of $O_2$ as described herein.

In an exemplary embodiment, the washcoat of U-SCR catalysts 90, 90' includes a porous ceramic matrix with a surface that is coated with a catalytically active amount of a base metal catalyst, i.e., an amount sufficient to catalyze the desired chemical reactions. Suitable base metal catalysts include copper (Cu) or iron (Fe), or a combination thereof, including alloys and compounds thereof. The porous matrix may include any suitable porous matrix. Suitable porous matrices include various zeolites, such as those that comprise alumina, including various alumina silicates. In the case of Cu catalysts, a suitable zeolite is one known commercially as ZSM-5. In another exemplary embodiment, the washcoat includes a porous ceramic matrix with a surface that is coated with a catalytically active amount of a base metal catalyst, where the base metal catalyst includes vanadium, including alloys and compounds thereof, such as vanadia ($V_2O_5$). The porous matrix may include any suitable porous matrix. Suitable porous matrices include titania, as well as various zeolites that include titania, and alumina, including various alumina silicates. Titania porous matrices may also include oxides of tungsten and molybdenum. The use of a base metal catalyst allows conversion of the $NO_X$ without the use of precious metals.

U-SCR catalysts 90, 90' utilize ammonia to reduce $NO_R$. In an exemplary embodiment, urea is provided upstream of the U-SCR catalysts 90, 90' through introduction of an aqueous urea solution. The urea is introduced upstream a sufficient distance from U-SCR catalysts 90, 90' to permit the urea to decompose in the exhaust gas flow 16 to form ammonia prior to entering U-SCR catalysts 90, 90'. In one advantageous configuration, ammonia is also generated within the LNT catalyst 88 and travels downstream to one of U-SCR catalysts 90, 90'. In this configuration, reduced amounts of urea are needed due to the ammonia generated in the LNT catalyst 88. U-SCR catalysts 90, 90' begin to function as described above at an operating temperature of about 356° F. (180° C.), and may be more preferably operated in the range of about 482° F. (250° C.) to about 1022° F. (550° C.).

U-SCR catalyst 90' and PF 30 comprise a two-way catalyst and are disposed within housing 20. They may be disposed in a chamber 93 formed within housing 20 (FIG. 2), or alternately, may be disposed in a can 76 (FIGS. 3-5) that is in turn disposed within housing 20, such as a metal can having an inlet opening and outlet opening, or otherwise, configured for providing support and directing exhaust gas flow 16 to U-SCR catalyst 90' and PF 30. The chamber 93 or can 76 may comprise any suitable shape or size including those having a cylindrical shape. The compartment further may include attachment features, such as a cylindrical inlet pipe located proximate an inlet opening and a cylindrical outlet pipe located proximate an outlet opening of the compartment for fluid coupling of U-SCR catalyst 90' and PF 30 to an exhaust pipe and/or another component of the exhaust aftertreatment system 12. It should be appreciated that the two-way catalyst, including the housing 20, may include one or more additional exhaust components for facilitating operation of the two-way catalyst, or exhaust aftertreatment system 12, or control system 32, including, but not limited to, various gas sensors 98 (e.g., $NO_X$) or temperature sensors 100, pressure sensors 102, HC injectors 104 or urea injectors 106, or otherwise. Such additional features may be particularly advantageous for monitoring characteristics of the exhaust gas flow 16, such as flow rate of certain emission components (e.g., particulate matter or otherwise), which may be particularly advantageous for determining the necessity of initiating U-SCR catalyst 90' or regeneration of PF 30.

Exhaust aftertreatment system 12 includes exhaust components, including various gas sensors 98 (e.g., $NO_X$) or temperature sensors 100, pressure sensors 102, HC injectors 104 or urea injectors 106 that are in signal communication with engine control system 32, including ECM 34. Gas sensors 98, such as, for example, a $NO_X$ sensor, are operative to sense exhaust gases exiting the engine 10 and generate an electrical signal correlatable to a parametric value for $NO_X$ concentration in the exhaust gas flow 16, and further operative to generate a second electrical signal correlatable to a parametric value for air/fuel ratio of the exhaust gas flow 16, from which oxygen content can be determined. Alternately, gas sensor 98 can comprise a virtual sensing device, wherein $NO_X$ concentration in the exhaust gas flow 16 is determined based upon engine operating conditions, which is a known technique. Temperature sensors 100 are operative to determine an operating temperature within system 12 for feedback and diagnostics.

Exhaust aftertreatment system 12 may include a HC injector 104 or dosing device for injecting a controlled amount of HC upstream of OC 26. An exemplary HC injector 104 includes a fuel injector, such as a diesel fuel injector, for injecting diesel fuel into exhaust gas flow 16. The fuel line 108 from engine 10 provides pressurized fuel to HC injector 104. The HC injector 104 is operably connected to the engine control system 32, which is adapted to control timing and quantity (e.g., mass flow) of HC that is injected, typically in the form of vehicle fuel, into the exhaust gas flow 16. Alternatively hydrocarbons from a hydrocarbon reservoir (not shown) or reformer device (not shown) may be used to provide HC.

Exhaust aftertreatment system 12 also includes a urea dosing device, such as urea injector 106, for injecting a controlled amount of urea or ammonia as a reductant upstream of U-SCR catalysts 90, 90' from a urea reservoir 112 through conduit 114. As used herein, the term urea may also include the use of ammonia ($NH_3$) as a reductant, since the urea decomposes to produce ammonia as a reaction by-product, and it is the ammonia that is used as a reactant species in the catalytic reactions that occur in U-SCR catalyst 90, 90'. An example of a suitable urea reservoir is a urea tank. The urea dosing device 110 is operably connected to the engine control system 32, which is adapted to control timing and quantity of urea injection into the exhaust gas flow 16. When urea is used as the reductant, injection should occur sufficiently upstream from U-SCR catalyst 90, 90' to enable the decomposition of the urea to ammonia prior to entry into the catalyst.

Engine control system 32 preferably comprises a distributed control module architecture including a plurality of control modules adapted to provide coordinated control of the various vehicle systems including the powertrain system described herein. The control system is operable to monitor inputs from sensing devices, synthesize pertinent information, and execute algorithms to control various actuators to meet operator demands and achieve control targets, including such parameters as fuel economy, emissions, performance, drivability, and protection of hardware. The distributed controller architecture includes ECM 34, and User Interface (UI) 116 which are operably connected to and in signal communication with other devices through which a vehicle operator typically controls or directs operation of the vehicle and powertrain. Devices through which a vehicle operator provides input to the UI 116 typically include an accelerator pedal, a brake pedal, transmission gear selector, and, vehicle speed cruise control. Each of the aforementioned control modules and devices communicate with other control modules, devices, sensors, and actuators via a high-speed local area network (LAN) bus, shown generally as item 118. The LAN bus 118 allows for structured communication of control parameters and commands between the various processors, control modules, and devices. The specific communication protocol utilized is application-specific. The LAN bus 118 and appropriate protocols provide for robust messaging and multi-control module interfacing between the aforementioned control modules and other control modules providing functionality such as antilock brakes, traction control, and vehicle stability.

The ECM 34 comprises a central processing unit signally electrically connected to volatile and non-volatile memory devices via data buses. ECM 34 is operably attached to sensing devices and other output devices to ongoingly monitor and control operation of the engine 10 and exhaust aftertreatment system 12, as shown. The output devices preferably include subsystems necessary for proper control and operation of the engine, including, by way of example, an air intake system, a fuel injection system, a spark-ignition system (when a spark-ignition engine is used, e.g., a homogeneous charge compression ignition engine), an exhaust gas recirculation (EGR) system, and an evaporative control system. The engine sensing devices include devices operable to monitor engine operation, external conditions, and operator demand, and are typically signally attached to the ECM 34 via wiring harnesses.

Algorithms stored in the non-volatile memory devices are executed by the central processing unit and are operable to monitor inputs from the sensing devices and execute engine control and diagnostic routines to control operation of the engine, using preset calibrations. Use of the ECM 34 to control and diagnose operation of various aspects of the internal combustion engine 10 is well known to one skilled in the art. However, the ECM 34 may be adapted to exploit the unique advantages of exhaust gas emission system 12 as described herein, to maximize the reduction of $NO_X$ under various operating regimes of engine 10, and also to maintain acceptable levels of $NO_X$ reduction during regeneration of PF 30.

Where first valve 38 or the second valve 50 include electrically controllable valves, engine control system 32, including ECM 34, may be used for signal communication to configure the valve positions and define the first operating mode, the second operating mode or the third operating mode.

Figure 6:
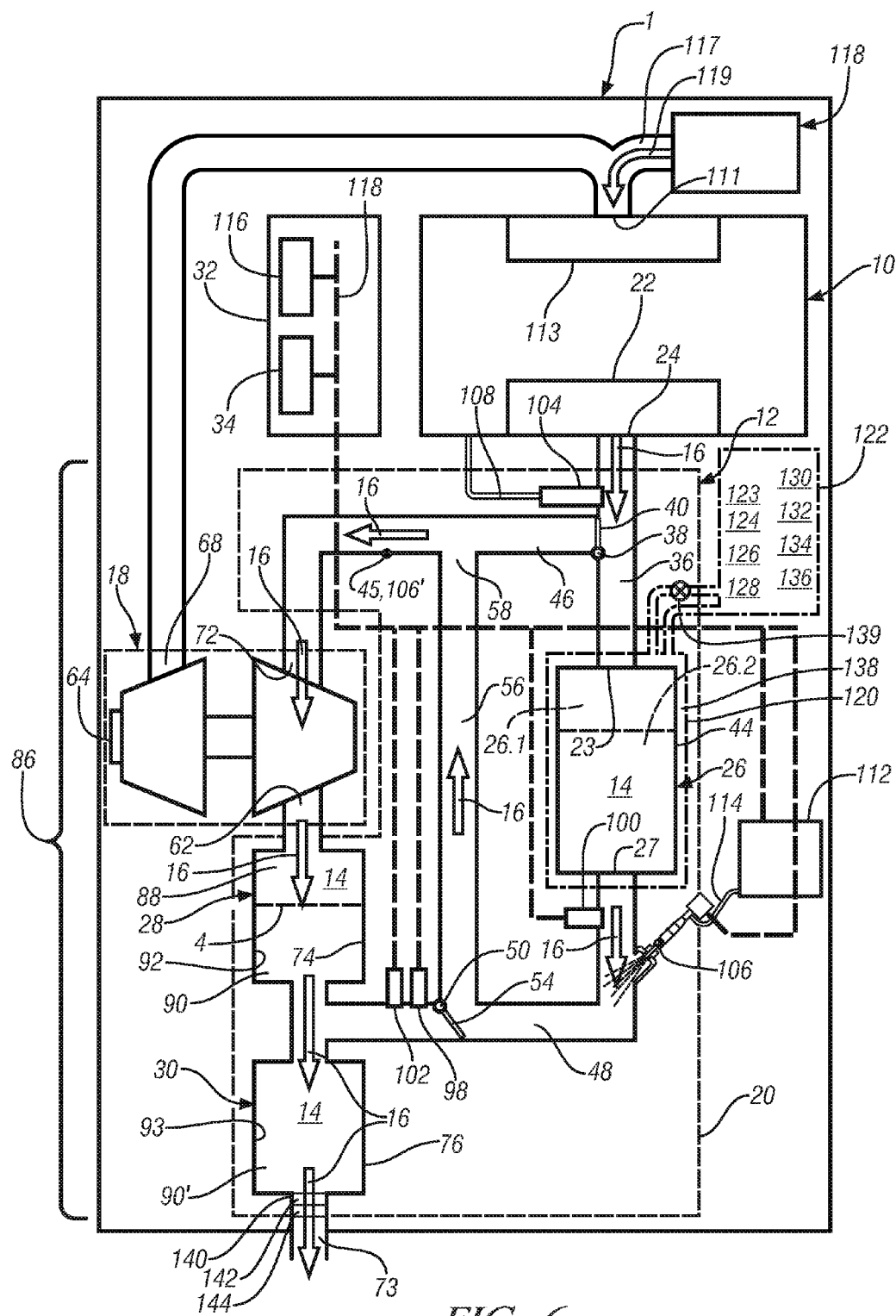
FIGS. 6-8 are schematic illustrations of a second exemplary embodiment of an engine and a closely-coupled exhaust aftertreatment system as disclosed herein in various exemplary operating modes as disclosed herein.
Figure 7:
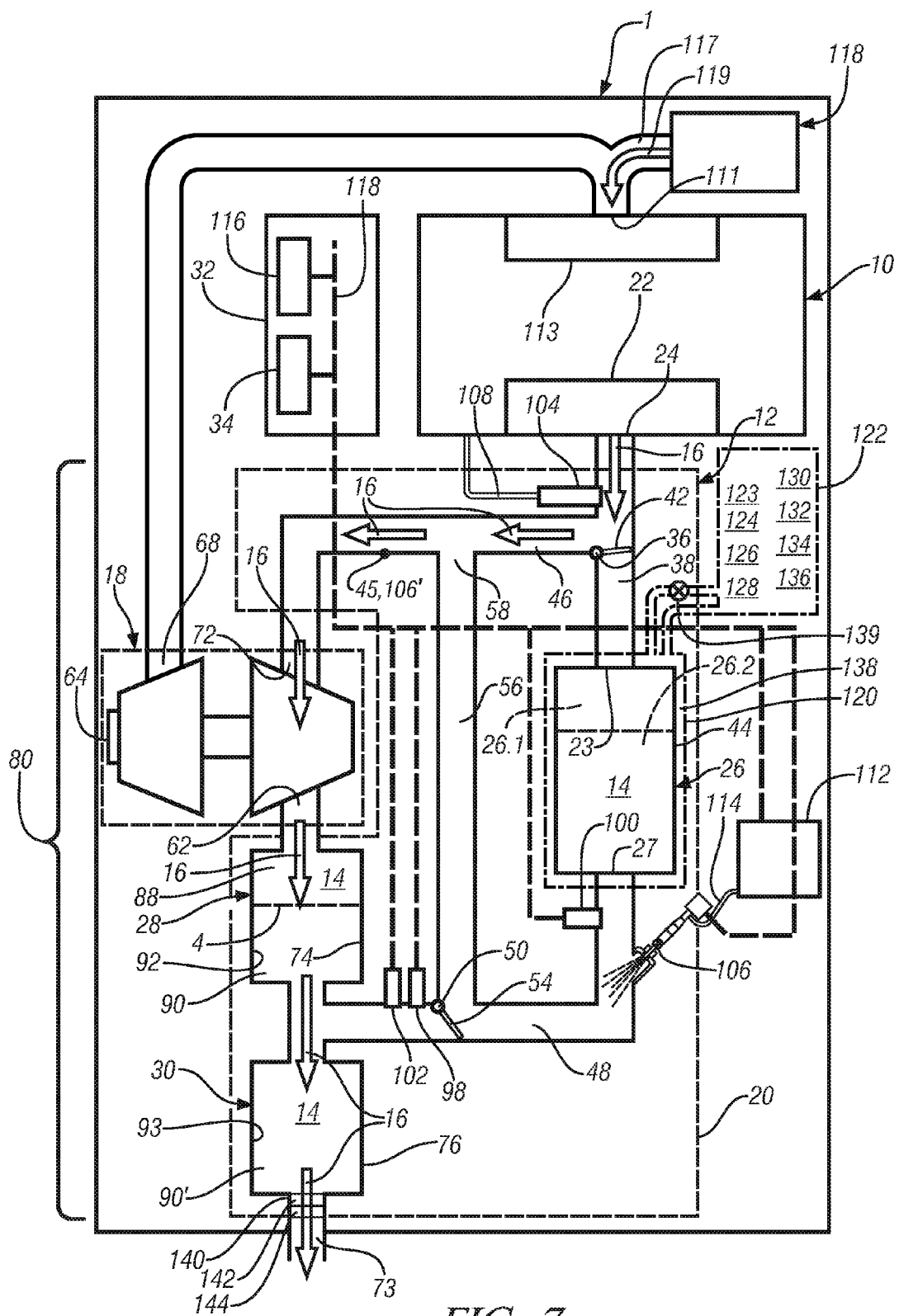
Figure 8:
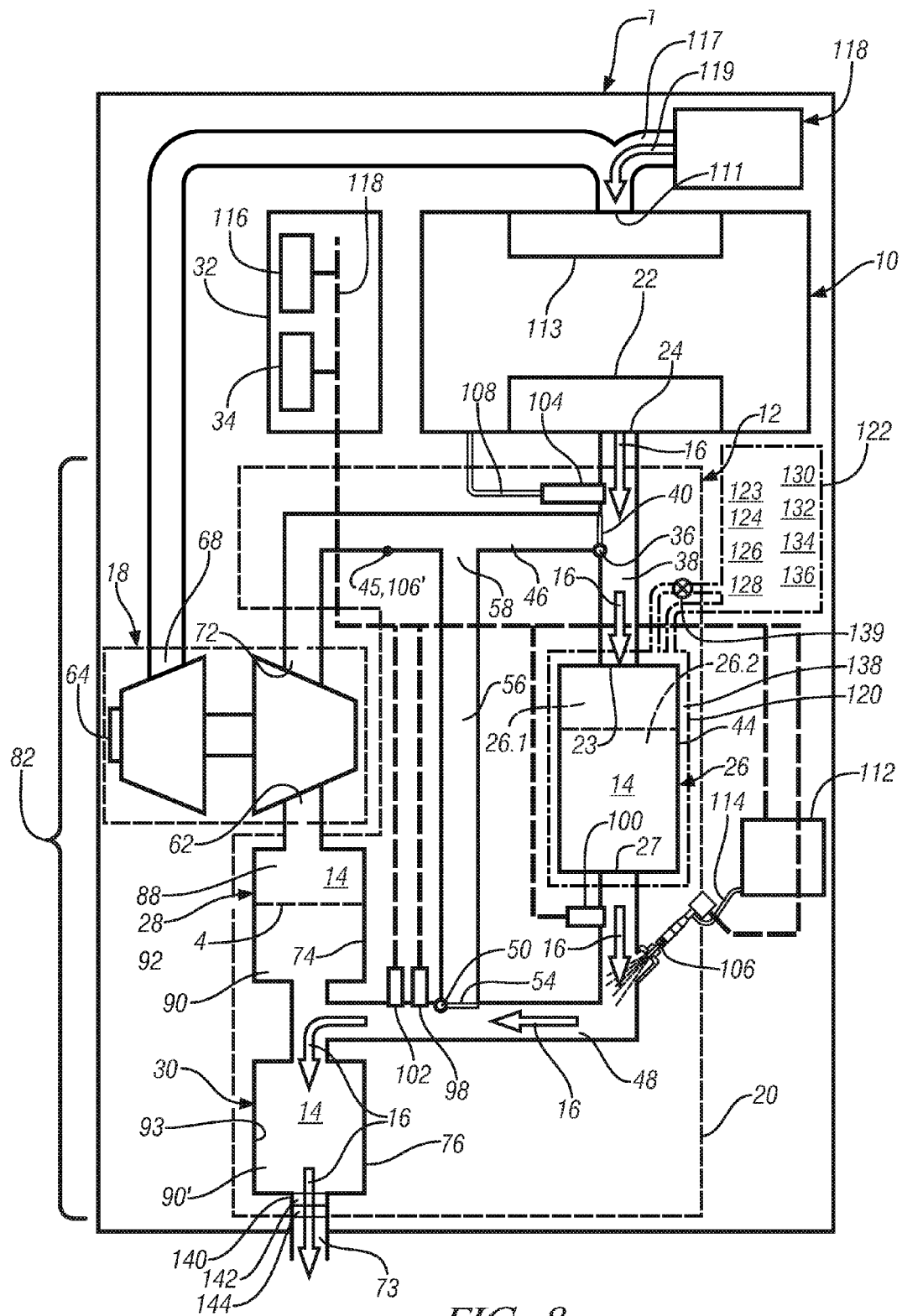

Referring to FIGS. 6-8, in another exemplary embodiment, an exhaust aftertreatment system 12 and turbocharger 18 having the components, configurations, functions and operating modes described above with reference to the embodiment of FIGS. 1-5 may also include a supercharger 118. In this embodiment, a compressor outlet 68 of the turbocharger 18 is fluidly coupled to and in fluid communication with an intake port 111, or to an intake manifold 113 that is configured to receive forced-induction intake airflows for distribution to a plurality of cylinders through at least one intake port 111, of the engine 10, including the receipt of forced-induction airflow 70 as a first forced-induction airflow thereto through conduit 115. Supercharger 118 is also fluidly coupled to and in fluid communication with intake port 111 through conduit 117 to provide a second forced-induction airflow 119 thereto. Supercharger 118 may be used to provide an additional amount of forced-induction intake airflow for any purpose, including providing an additional amount of forced-induction intake airflow for use in any of the operating modes described herein, particularly the third operating mode 82. Supercharger 118 may also be used to provide an additional amount of forced-induction intake airflow during transient flow conditions, such as, for example, while transitioning from one operating mode to another while the positions of first valve 38 and second valve 50 are being changed. Supercharger 118 may be of conventional construction, and may be powered by engine 10 or by a separate electric motor or other drive means.

As illustrated in FIGS. 6-8, in another exemplary embodiment, exhaust aftertreatment system 12 as described herein may also optionally include an exhaust heat recovery device 120 that is thermally coupled to at least one of the exhaust aftertreatment devices 14, including OC 26, or PF 30, or both of them, to provide heat to another or second vehicle system 122. As illustrated in conjunction with the embodiment of the exhaust aftertreatment system 12 of FIGS. 6-8, exhaust heat recovery device 120 may also be included with other embodiments of the invention, including the embodiment thereof illustrated in FIGS. 1-5. Since the OC 26 in exhaust aftertreatment system 12 is closely coupled to the engine 10, the catalyst therein is configured to rapidly achieve its operating temperature and light-off upon engine cold-start so that it is able to rapidly provide heat through the exothermic reactions promoted therein to second vehicle system 122, and generally may do so much more rapidly than by other means that may be available to heat this system. Second vehicle system 122 may be any vehicle system, but will preferably be a vehicle system 122 in which the operating performance of the vehicle 1, or engine 10, or the system 122, may be enhanced by receiving heat from the OC 26, particularly under a cold-start condition where the system 122 is at an ambient temperature that may be as low as −40° F. or lower. Examples of vehicle systems 122 that may be thermally coupled to OC 26 include an engine coolant system 123, an engine lubrication system 124, a transmission system 126, an electrical supply system 128, an electrical storage system 130, a hydraulic system 132, a fuel system 134, or an environmental control system 136, or a combination thereof.

The exhaust heat recovery device 120 may be any suitable heat recovery device. In an exemplary embodiment, exhaust heat recovery device 120 may include a heat exchanger 138 that is in thermal communication with OC 26. As used herein, "thermal communication" means the passage of heat from one device or location to another device or location. For example, thermal communication between OC 26 and heat exchanger 138 means communication of heat from OC 26 to heat exchanger 138. Generally, thermal communication utilizes thermally conductive materials, such as metals, to extract heat from the exhaust gas flow 16 where it may be exchanged to warm thermally conductive fluids that may be transported using conduits, pipes, mounting flanges, seals, gaskets and other structures and features for accomplishing communication of the fluid to the second vehicle system 122. Any suitable heat exchanger 138 may be employed, including those that are configured to exchange heat directly with a fluid from the vehicle system 122, as well as those that are configured to exchange heat indirectly from a separate working fluid to a fluid from the vehicle system 122, and also including heat exchangers that are configured to circulate a separate working fluid to the vehicle system 122 to provide heat thereto. The thermal communication provided may also be controlled communication, such as, for example, thermal communication that is switchable between a thermally coupled condition and a thermally uncoupled condition, such as by use of a valve 139. Alternately, the amount of heat communicated may be controlled to an amount that ranges between 0-100 percent of the heat available for communication.

As illustrated in FIGS. 6-8, exhaust aftertreatment system 12 may also include an exhaust aftertreatment device 14 comprising a clean-up catalyst 140 located downstream of PF 30 to further modify exhaust gas flow 16 and remove or convert undesirable exhaust constituents that may otherwise have a propensity to slip through the other exhaust treatment devices 14. Clean-up catalyst 140 may include a reduction catalyst, including a second SCR catalyst 142 or an OC, including a second OC 144 as illustrated in FIGS. 3-5, or a combination thereof as illustrated in FIGS. 6-8, where PF 30 may have a second SCR catalyst 142 on a downstream end thereof and a separate second OC 144 is located downstream of PF 30 and second SCR catalyst 142. The clean-up catalyst 140, whether a second SCR catalyst 142 or second OC 144, may have a construction and composition as described herein for the SCR catalyst 28 and OC 26, respectively, or may have a different construction and composition.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed as the best mode contemplated for carrying out this invention, but that the invention will include all embodiments falling within the scope of the present application.

What is claimed is:

1. A closely-coupled exhaust aftertreatment system and turbocharger, comprising:
    a first exhaust conduit comprising a first valve operable between a first position and a second position, the first position promoting an exhaust flow within the first exhaust conduit to an inlet of an oxidation catalyst (OC), and the second position promoting the exhaust gas flow within a second exhaust conduit;
    a third exhaust conduit fluidly coupled to an outlet of the OC, the third exhaust conduit comprising a second valve operable between a first position and a second position; the first position promoting an exhaust flow within the third exhaust conduit to an inlet of a particulate filter (PF), and the second position promoting the exhaust gas flow through a fourth exhaust conduit to an inlet in the second exhaust conduit;
    a turbocharger that is fluidly coupled to the second exhaust conduit downstream of the inlet; and
    a selective catalyst reduction (SCR) catalyst that is located downstream of and fluidly coupled to the turbocharger to receive the exhaust gas flow therefrom and located upstream of and fluidly coupled to the PF to provide the exhaust gas flow thereto.

2. The exhaust aftertreatment system and turbocharger of claim 1, further comprising a housing, wherein the OC, SCR catalyst and PF are disposed within the housing.

3. The exhaust aftertreatment system and turbocharger of claim 2, wherein the first exhaust conduit, second exhaust conduit, third exhaust conduit and fourth exhaust conduit are disposed on or within the housing, or a combination thereof.

4. The exhaust aftertreatment system and turbocharger of claim 1, further comprising an engine, wherein the first exhaust conduit is attached to an exhaust port of the engine.

5. The exhaust aftertreatment system and turbocharger of claim 1, wherein the OC comprises a first OC and a second OC fluidly coupled to and located downstream from the first OC.

6. The exhaust aftertreatment system and turbocharger of claim 1, wherein the turbocharger is disposed on the housing.

7. The exhaust aftertreatment system and turbocharger of claim 1, wherein the positions of the first valve and the second valve may be movably configured to define a first operating mode, a second operating mode and a third operating mode.

8. The exhaust aftertreatment system and turbocharger of claim 7, wherein in the first operating mode the first valve is in the first position and the second valve is in the second position and the exhaust gas flow follows a first path through the OC, turbocharger, and SCR catalyst.

9. The exhaust aftertreatment system and turbocharger of claim 7, wherein in the second operating mode the first valve is in the second position and the second valve is in the second position and the exhaust gas flow follows a second path through the turbocharger, SCR catalyst and PF.

10. The exhaust aftertreatment system and turbocharger of claim 7, wherein in the third operating mode the first valve is in the first position and the second valve is in the first position and the exhaust gas flow follows a third path through the OC and the PF.

11. The exhaust aftertreatment system and turbocharger of claim 7, wherein the first valve or second valve, or a combination of them, comprises an electrically controllable valve or a thermostatically controllable valve, or a combination thereof.

12. The exhaust aftertreatment system and turbocharger of claim 1, wherein the SCR catalyst comprises a lean $NO_X$ trap (LNT) or a urea-SCR (U-SCR) catalyst, or a combination thereof.

13. The exhaust aftertreatment system of claim 1, wherein the SCR catalyst comprises an LNT fluidly coupled to the turbocharger and a U-SCR catalyst disposed on the PF.

14. The exhaust aftertreatment system and turbocharger of claim 1, further comprising an engine, wherein the first exhaust conduit is fluidly coupled to an exhaust port of the engine, and a housing, wherein the OC, SCR catalyst and PF are disposed within the housing and the first exhaust conduit, second exhaust conduit, third exhaust conduit and fourth exhaust conduit are disposed on or within the housing, or a combination thereof.

15. The exhaust aftertreatment system and turbocharger of claim 14, further comprising an exhaust heat recovery device that is thermally coupled to the OC to provide heat to a second vehicle system that is operably coupled to the engine.

16. The exhaust aftertreatment system and turbocharger of claim 15, wherein the exhaust heat recovery device is a heat exchanger and the second vehicle system comprises an engine coolant system, an engine lubrication system, a transmission system, an electrical supply system, an electrical storage system, a hydraulic system, a fuel system or an environmental control system, or a combination thereof.

17. The exhaust aftertreatment system and turbocharger of claim 15, wherein the thermal coupling of the OC and second vehicle system is switchable between a thermally coupled condition and a thermally uncoupled condition.

18. The exhaust aftertreatment system and turbocharger of claim 14, wherein a compressor outlet of the turbocharger is fluidly coupled to an intake port of the engine to provide a first forced-induction airflow thereto, and further comprising a supercharger that is also fluidly coupled to the intake port to provide a second forced-induction airflow thereto.

19. The exhaust aftertreatment system and turbocharger of claim 14, further comprising an exhaust heat recovery device that is fluidly and thermally coupled to the exhaust aftertreatment system proximate the PF, either upstream or downstream thereof, to provide heat to a second system that is operably coupled to the engine.

20. The exhaust aftertreatment system and turbocharger of claim 19, wherein the exhaust heat recovery device is a heat exchanger and the second system comprises an engine coolant system, an engine lubrication system, a transmission system, an electrical supply system, an electrical storage system, a hydraulic system, a fuel system or an environmental control system, or a combination thereof.

21. The exhaust aftertreatment system and turbocharger of claim 1, further comprising a clean-up catalyst downstream of the PF.

22. The exhaust aftertreatment system and turbocharger of claim 21, wherein the clean-up catalyst comprises a second OC.

* * * * *